United States Patent
Dotan et al.

(10) Patent No.: US 12,135,381 B2
(45) Date of Patent: Nov. 5, 2024

(54) PRECISION POSITIONING AND POINTING INSTRUMENT

(71) Applicants: James Dotan, Haymarket, VA (US); Bart Gallet, Arlington, VA (US)

(72) Inventors: James Dotan, Haymarket, VA (US); Bart Gallet, Arlington, VA (US)

( * ) Notice: Subject to any disclaimer, the term of this patent is extended or adjusted under 35 U.S.C. 154(b) by 657 days.

(21) Appl. No.: 17/462,745

(22) Filed: Aug. 31, 2021

(65) Prior Publication Data

US 2024/0168176 A1    May 23, 2024

(51) Int. Cl.
   *G01S 19/48*    (2010.01)

(52) U.S. Cl.
   CPC .................. *G01S 19/48* (2013.01)

(58) Field of Classification Search
   CPC .... G01C 25/00; G01C 25/005; G01C 15/002; G01C 1/00; G01C 1/02; G01C 1/04; H01Q 21/28; G01S 19/48
   See application file for complete search history.

(56) References Cited

U.S. PATENT DOCUMENTS

| | | |
|---|---|---|
| 453,158 A | 5/1891 | Paoli |
| 3,191,176 A | 6/1965 | Guier |
| 4,741,245 A | 5/1988 | Malone |
| 4,870,422 A | 9/1989 | Counselman, III |
| 4,881,080 A | 11/1989 | Jablonski |
| 5,379,045 A | 1/1995 | Gilbert et al. |
| 5,617,317 A | 4/1997 | Ignagni |
| 5,717,406 A * | 2/1998 | Sanderford ............... G01S 5/14 342/363 |
| 5,777,578 A | 7/1998 | Chang et al. |
| 6,035,254 A | 3/2000 | Nichols |
| 6,064,942 A | 5/2000 | Johnson et al. |
| 6,304,210 B1 | 10/2001 | Allison et al. |
| 6,369,755 B1 | 4/2002 | Nichols et al. |
| 6,727,849 B1 | 4/2004 | Kirk et al. |

(Continued)

OTHER PUBLICATIONS

Baseline or base line. (1992). In C. G. Morris (Ed.), Academic Press Dictionary of Science and Technology (4th ed.). Elsevier Science & Technology. Credo Reference: https://search.credoreference.com/content/entry/apdst/baseline_or_base_line/0 (Year: 1992).*

(Continued)

*Primary Examiner* — Bernarr E Gregory
*Assistant Examiner* — Fred H Mull
(74) *Attorney, Agent, or Firm* — STAAS & HALSEY LLP (57) ABSTRACT

True North is determined accurately and precisely, so that a bearing can be measured to an object of interest that is visible over a line-of-sight distance. Heading sensors based on measuring the magnetic vector field of the earth are subjected to magnetic and electrical interferences, so-called hard and soft iron effects. Obtaining a true heading not only depends on how well calibration reduces or eliminates these disturbances, but also depends on the accuracy of the world magnetic field model. A precision positioning and pointing system accurately provides geodetic positions and True North, independent of the magnetic earth vector field's sensors and therefore, is not subject to magnetic and electrical interference. This is accomplished without requiring a high precision inertial navigation system using the dead-reckoning method to define True North.

18 Claims, 10 Drawing Sheets

(56) References Cited

U.S. PATENT DOCUMENTS

| | | | |
|---|---|---|---|
| 6,732,051 | B1 | 5/2004 | Kirk et al. |
| 7,451,059 | B2 | 11/2008 | Malchi et al. |
| 7,468,695 | B1 | 12/2008 | Williams |
| 8,311,757 | B2 | 11/2012 | Lin |
| 8,686,900 | B2 | 4/2014 | Whitehead et al. |
| 8,705,022 | B2 | 4/2014 | Taylor et al. |
| 8,904,656 | B2 | 12/2014 | Hohl et al. |
| 9,372,070 | B1 | 6/2016 | Jancic et al. |
| 9,551,980 | B2 | 1/2017 | Akcasu et al. |
| 9,689,673 | B2 | 6/2017 | Bejeryd et al. |
| 10,337,833 | B2 | 7/2019 | Knapp |
| 10,795,030 | B2 | 10/2020 | Schipper et al. |
| 2006/0069469 | A1* | 3/2006 | Campbell ............ G01C 21/166 701/4 |
| 2007/0104353 | A1* | 5/2007 | Vogel .................. G01C 25/00 382/106 |
| 2014/0300886 | A1* | 10/2014 | Zogg .................. G01C 15/002 356/4.01 |
| 2018/0274910 | A1* | 9/2018 | Heidemann ......... G01C 15/002 |
| 2018/0295272 | A1* | 10/2018 | Xue ..................... G06V 20/17 |
| 2019/0204123 | A1* | 7/2019 | Zhao ................ G01C 19/5776 |
| 2019/0383609 | A1 | 12/2019 | Simon |
| 2020/0357141 | A1* | 11/2020 | Zhou ..................... G01C 25/00 |

OTHER PUBLICATIONS

Bakula et al.; "Reliable Technology of Centimeter GPS/GLONASS Surveying in Forest Environments, IEEE Transactions on Geoscience and Remote Sensing", vol. 53, No. 2, Feb. 2015, pp. 1029-1038.

Gang Lu; "Development of a GPS Multi-Antenna System for Attitude Determination", UCGE Reports No. 20073, Univ. of Calgary Dept. of Geomatics Engineering, Jan. 1995, pp. i-xvi, 1-179.

Awange et al.; "Environmental Geoinformatics: Monitoring and Management", Springer, 2013, pp. i-xx, 1-541.

Linton; History of Navigation, A Wikipedia Compilation, pp. 1-156, 2013.

Grewal et al.; "Global Positioning Systems, Inertial Navigation, and Integration"; John Wiley & Sons, pp. i-xix, 1-392.

Hovde; "Compact Sensor System for Target Localization", University of Oslo, Spring 2017, pp. i-x, 1-53.

Lee et al.; "Study for Improving Target Coordinate Acquisition Accuracy from Long Distance by VRS RTK", Journal of the KIMST, vol. 21, No. 4, 2018, pp. 471-480.

"Target Coordinates. Everywhere. Anytime.", STERNA, printed on Aug. 26, 2021 from www.militarysystems-tech.com/suppliers/military-optronic-equipment-systems-and-sensors/vectronix#supplier-profile.

* cited by examiner

PRECISION POSITIONING AND POINTING INSTRUMENT

BACKGROUND

Global Navigation Satellite Systems (GNSS) are often used for obtaining heading measurement estimates. Most notably in navigation systems for mobile systems, the direction of travel is obtained from measuring the vehicle's velocity vector.

Inexpensive magnetometers currently available in digital compasses have an accuracy of 2-3° and depend on the accuracy of the world magnetic field model. While suitable for directions when travelling, the lack of accuracy and precision are significant drawbacks in other applications.

Gyro compassing is another way of measuring a heading which depends on accurately measuring the earth's angular velocity by an inertial measurement unit. Currently, a high accuracy inertial sensor and navigation system are available with a heading accuracy of 0.1 degrees when in motion. However, such systems are expensive and inertial navigation systems are ineffective for static applications, such as surveying. Furthermore, higher accuracy is desired for some applications.

A heading obtained from Real Time Kinematic (RTK) compassing—i.e., the vector obtained over a known baseline between two GNSS antennas—is another GNSS-based approach that does not require a velocity vector but often requires baselines of many meters to obtain the required accuracy. In many applications, this requires structural dimensions that are not practical.

For example, to obtain True North with an accuracy of 0.1°, known techniques use a highly accurate inertial sensor based system that may cost $100,000 or "gravity finder" devices along with multiple GPS systems collocated at distances of 100 m or more, as separate mobile elements, which make it impossible for applications, since the implementation is very expensive or very large and cumbersome, and the calibration process is complicated and typically requires more than one person.

SUMMARY

A precision positioning and pointing instrument uses a combination of sensors that are compact and affordable with a calibration process that obtains an accurate True North. This enables a laser rangefinder to provide precise geolocation coordinates of an object of interest.

An aspect of the system is to perform manual calibration by a human operator who accurately directs a pointing device, such as a telescope, to a reflector that was placed at a required distance and engages a calibration process to determine True North which is then recorded.

Another aspect of the system is automatic continuous calibration using an automatic seeker calibration system. In this embodiment, the operator points the telescope towards an object of interest (OOI) for which an accurate bearing is required. During automatic calibration, the automatic calibration seeker acquires lock onto a calibration reflector of a calibration antenna assembly that was placed at a known distance and within the field of the view of an automatic calibration seeker to determine the True North. The automatic calibration seeker maintains lock onto the calibration reflector and provides updated calibration information to a processor as long as the calibration antenna assembly remains in the automatic calibration seeker's field of view, during which a precision positioning and pointing instrument (P3I) is continuously calibrated.

Following completion of the calibration process, the P3I operator directs the pointing device to the object of interest (OOI) to determine geodetic coordinates of the OOI and line-of-sight angles to the OOI which are transmitted via a communication device to the operator and other users.

BRIEF DESCRIPTION OF DRAWINGS

These and other aspects and advantages will become more apparent and more readily appreciated from the following description of the exemplary embodiments, taken in conjunction with the accompanying drawings which are schematic and not necessarily to scale.

DETAILED DESCRIPTION OF EMBODIMENT(S)

Reference will now be made in detail to embodiments, examples of which are illustrated in the accompanying drawings. In this regard, the embodiments may have different forms and should not be construed as being limited to the descriptions set forth herein. In clearly describing features of the embodiments, descriptions of other features that are well known to one of ordinary skill in the art may be omitted.

The indefinite articles "a" and "an" do not exclude a plurality of the following noun. Any use of "and/or" includes all combinations of preceding and following items, including a single item among those items. The words "at least one" preceding a list of items denotes any one item in the list or any combination of the items in the list. For example, at least one of A, B and C includes A; B; C; A and B; A and C; B and C; and A, B and C, regardless of whether A, B or C is a plural noun.

Figure 1A:
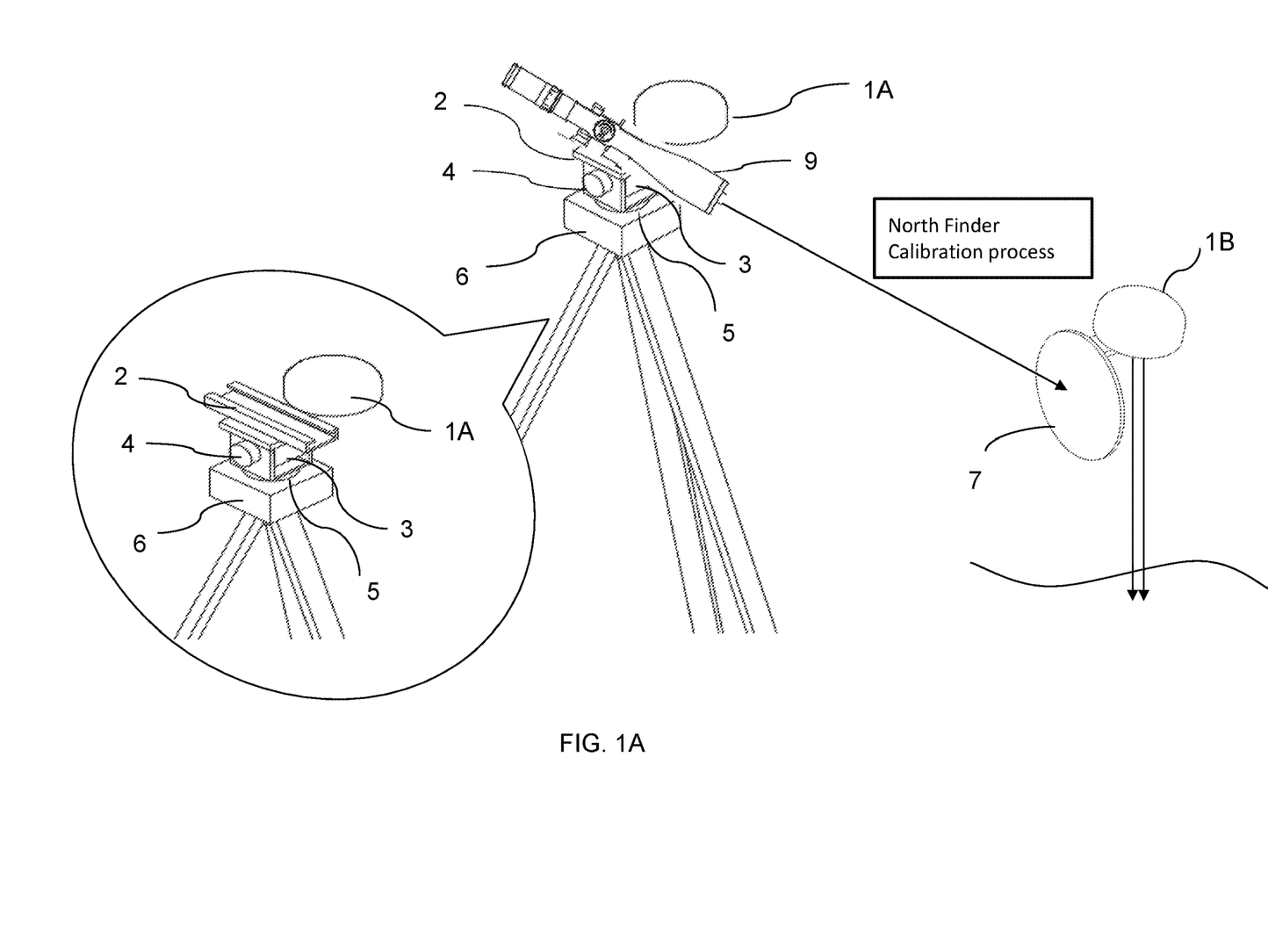
FIG. 1A is a perspective view of a precision positioning and pointing instrument (P3I) with a mounted pointing device, and a calibration antenna assembly.

FIG. 1A is a perspective view of an embodiment of a precision positioning and pointing instrument (P3I) with a mounted pointing device 9, and a calibration antenna assembly. The pointing device 9 may be a telescope, an electro-optical/infra-red (EO/IR) camera or similar instrument capable of precisely aligning a structure in the P3I with an external point using optics or any known sensing mechanism. The P3I accurately measures the bearing to an object of interest (OOI) 21 (FIG. 6), visible over a line-of-sight distance, and its geodetic coordinates. Illustrated in FIG. 1A are a first Global Navigation Satellite Systems (GNSS) antenna 1A that receives first signals, a universal mounting connector rail 2 on main gimbal set 3, having two-degrees-of-freedom, with a pitch encoder 4 and yaw encoder 5 to obtain angular measurements as main encoders. An electronics box 6 may serve as a base on which the main gimbal set 3 is mounted. The electronics box 6 may contain two GNSS receivers connected to an external GNSS antennas 1A mounted on the P3I and having a wired or wireless connection to a second GNSS antenna 1B that receives second signals and is co-located with reflector 7 a distance away from the P3I, as discussed below with respect to FIG. 3A.

Figure 1B:
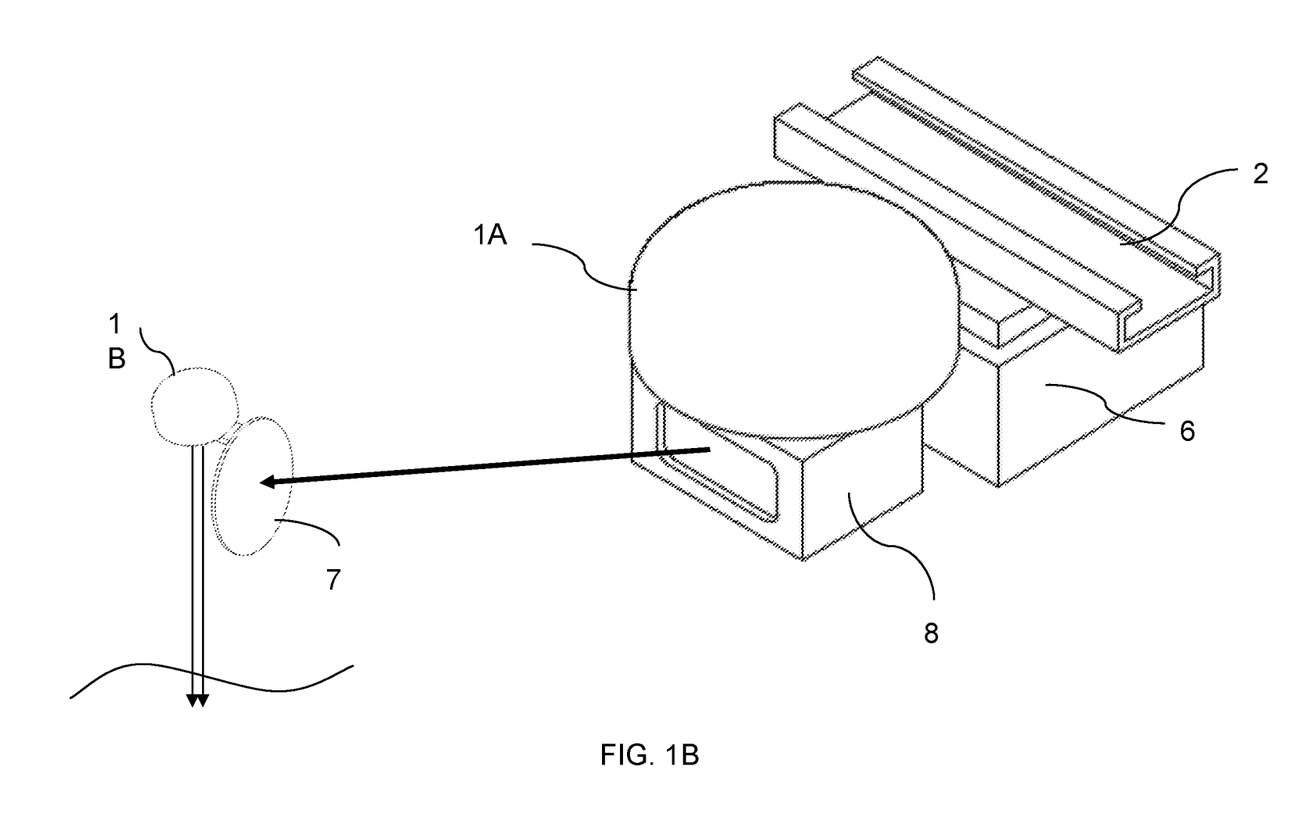
FIG. 1B is a perspective view of a precision positioning and pointing instrument (P3I) with a seeker, and a calibration antenna assembly.

FIG. 1B is a perspective view of an embodiment of a P3I without a mounted pointing device, including GNSS antenna 1A, universal mounting connector rail 2, an automatic calibration seeker 8, and electronics box 6 which includes two GNSS receivers. The GNSS antenna 1A, universal mounting rail 2 and electronics box 6 are common components in FIGS. 1A and 1B.

Figure 6:
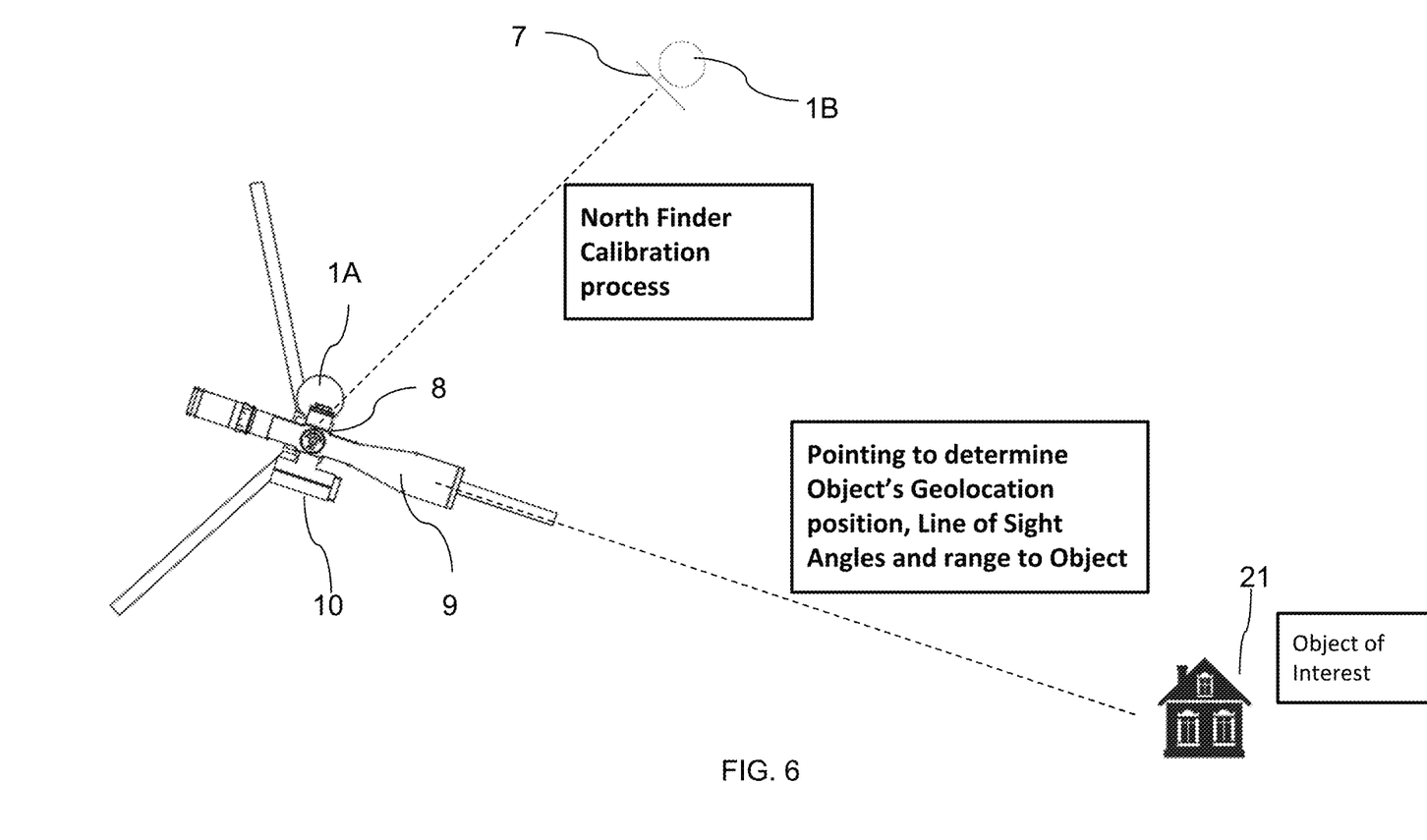
FIG. 6 is a top view of a precision positioning and pointing instrument (P3I) with a laser range finder, and a calibration antenna assembly and a side view of an object of Interest.

The precision positioning and pointing instrument (P3I) can accurately estimate the geodetic coordinates (latitude and longitude) of an object of interest (OOI) 21 (FIG. 6) visible over a line-of-sight distance when used in conjunction with a laser range finder, as depicted in FIG. 6. The P3I may also serve as a North Finder for any type of application that requires accurate heading and does not have a high accuracy inertial navigation system (INS) or magnetometer.

Relative angular positional information may be obtained passively by placing the mounting rail 2 and pointing device 9 on main gimbal set 3 that is instrumented with pitch encoder 4 and yaw encoder 5 as illustrated in FIG. 1A. The P3I may be mounted on a tripod, as depicted in FIG. 1A.

Figure 2:
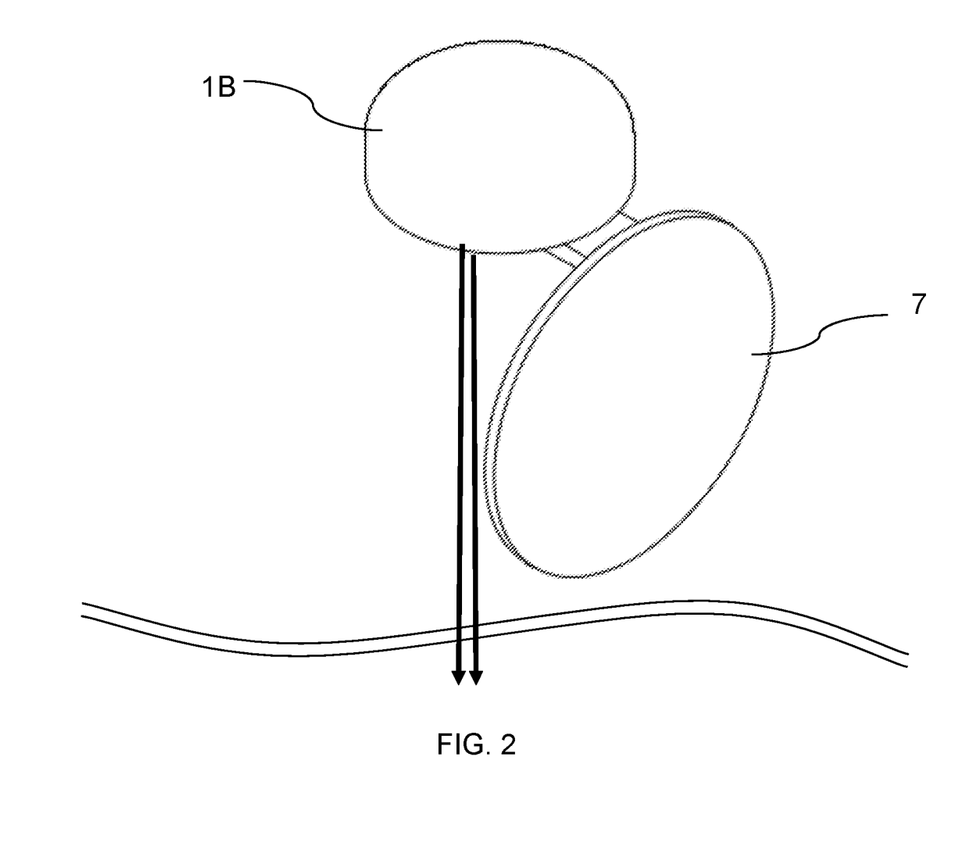
FIG. 2 is a perspective view of a calibration antenna assembly.

The P3I is used with a calibration antenna assembly that includes GNSS antenna 1B and calibration reflector 7. An enlarged drawing of an embodiment of the calibration antenna assembly is illustrated in FIG. 2 with GNSS antenna 1B and calibration reflector 7 both mounted on a pole that may be inserted in the ground in any direction within open space of the P3I. The relative distance from the P3I to the calibration antenna assembly may be obtained by the GNSS receivers having a wired or wireless connection to GNSS antenna 1A on the P3I and GNSS antenna 1B on the calibration antenna assembly, respectively.

Figure 1C:
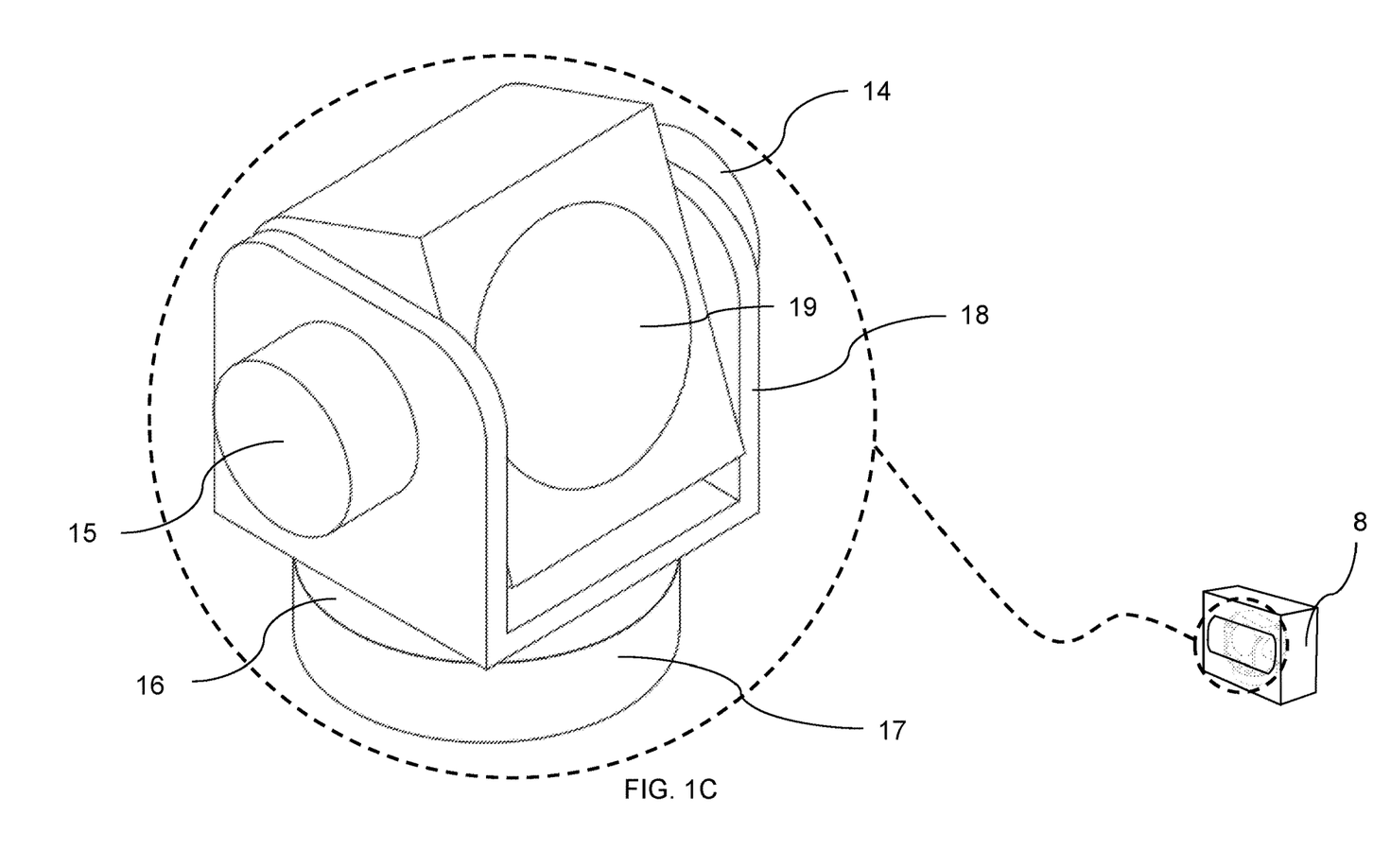
FIG. 1C is a perspective view of a seeker.

FIG. 10 is a perspective view of an embodiment of automatic calibration seeker 8 which includes a seeker gimbal set 18 and a sensor 19 mounted on seeker gimbal set 18 and able to detect objects outside automatic calibration seeker 8, e.g., through an enclosure that has at least a portion transparent to wavelength(s) detectable by sensor 19. The seeker gimbal set 18 is controlled by pitch actuator 15 and yaw actuator 17. A pitch encoder 14 and a yaw encoder 16 form seeker encoders that provide accurate angular position feedback to processor 11 (FIG. 3A) when the sensor 19 is locked on the calibration reflector 7 of the calibration antenna assembly (FIG. 2).

The sensor 19 constitutes equipment capable of tracking the calibration reflector 7 and may include an electro optical (EO) sensor, infrared sensor (IR), a laser range finder, a radio frequency (RF) based sensor (e.g. RADAR), or other known tracking technology. One example of an implementation could consist of a small EO device such as a CMOS camera continuously observing the reflector 7 coated with a pattern, such as a QR code or ArUco pattern, which are significantly more accurate for automatic image processing than a cross hair. Such cameras are available with a resolution of 3840× 2160 pixels and a frame rate of 30 fps that can be used. This allows the software algorithm to close the controller loop, thereby orienting the seeker along the line of sight directly to the static reflector. Other sensors may be used to drive the seeker controller and to close the loop locking the seeker on the reflector.

Figure 3A:
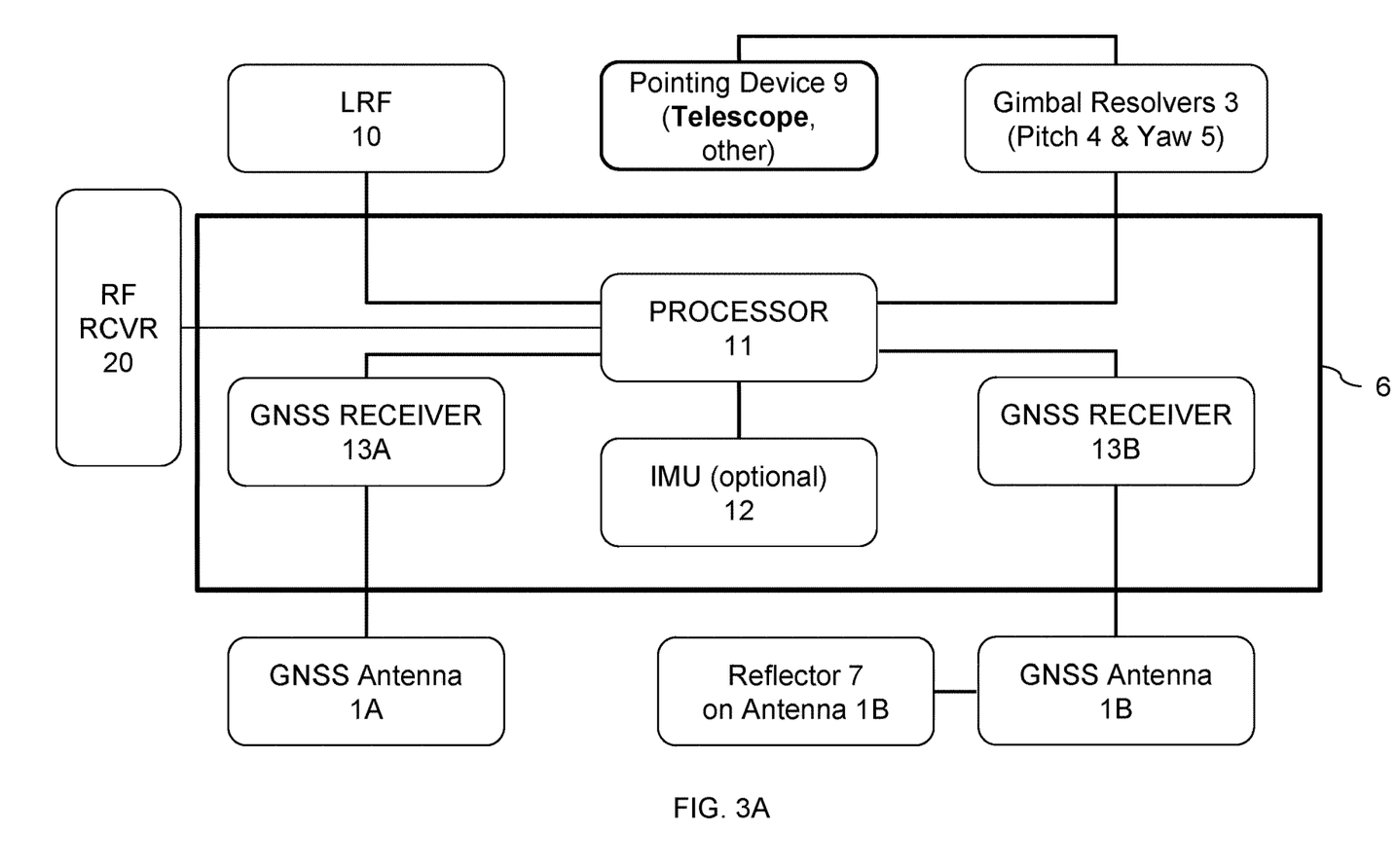
FIG. 3A is a block diagram of system components in an embodiment of an electronics box of a precision positioning and pointing instrument (P3I).

FIG. 3A is a block diagram of components in the electronics box 6 of an embodiment of the P3I. GNSS receiver 13A, which may be inside or outside the electronics box 6, is connected to GNSS antenna 1A mounted externally on the P3I. GNSS receiver 13B (internal or external to the electronics box 6) is connected to GNSS antenna 1B placed, along with the calibration reflector 7, at a distance required to have the accuracy desired. In some embodiments, a distance from the P3I of 1 m to 30 m or longer may be used. Processor 11 may be communicatively connected with both GNSS receivers 13A and 13B, a laser range finder (LRF) 10, and the pitch 4 and yaw 5 resolver of main gimbal set 3. Pointing device 9, e.g., a telescope, electro-optical/infra-red (EO/IR) camera or other viewing device is installed on rail 2 of main gimbal set 3. The LRF 10 may be used to detect reflection of a laser from calibration reflector 7 or measure a distance from pointing device 9 to the OOI 21 (FIG. 6).

Figure 3B:
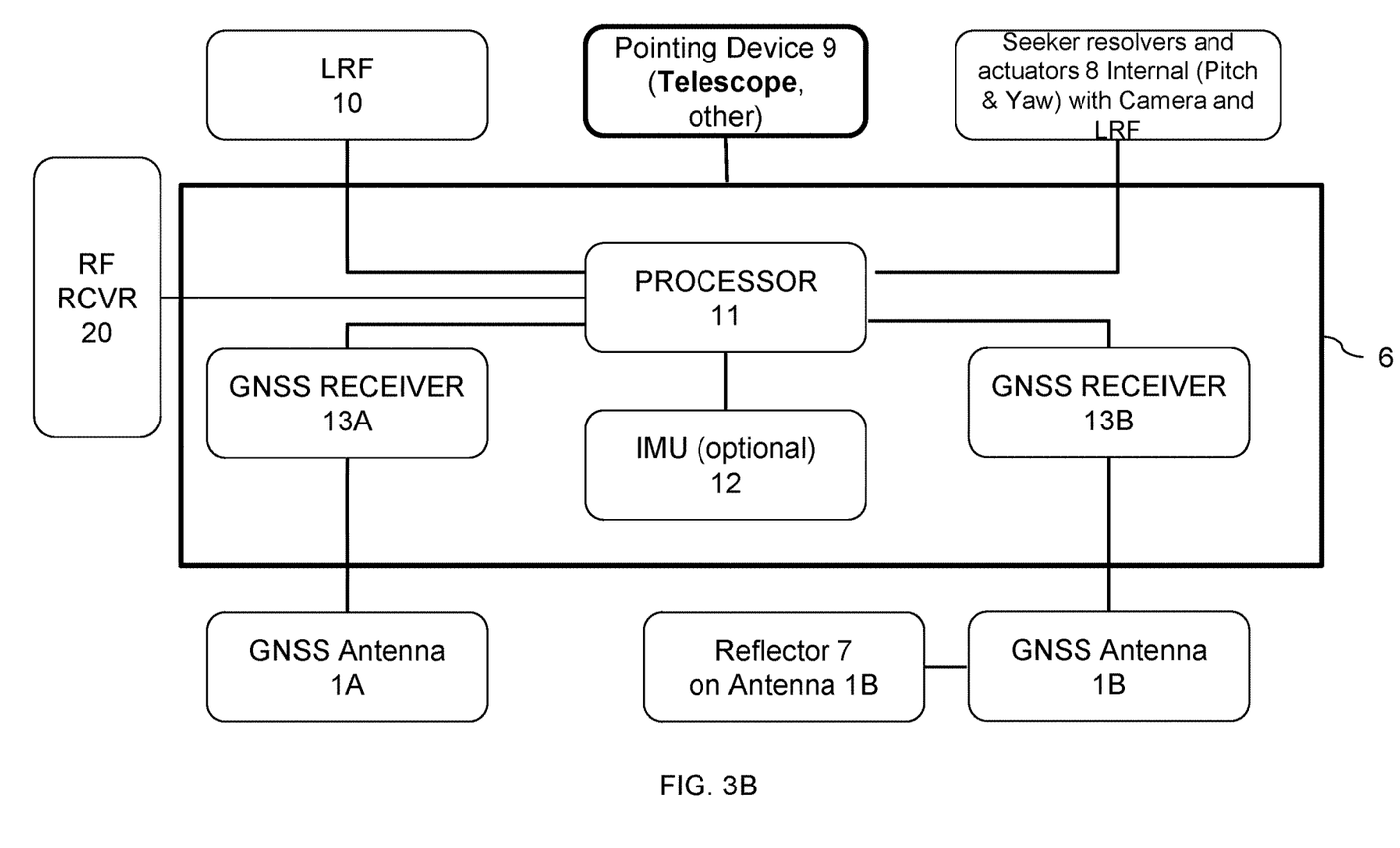
FIG. 3B is a block diagram of system components in another embodiment of an electronics box of a precision positioning and pointing instrument (P3I).

FIG. 3B is a block diagram of components in the electronics box 6 of another embodiment of the P3I. As in the embodiment illustrated in FIG. 3A, GNSS receiver 13A (internal or external) is communicatively connected to GNSS antenna 1A outside on the P3I and GNSS receiver 13B (internal or external) is communicatively connected to GNSS antenna 1B on the calibration reflector assembly. In addition to GNSS receivers 13A and 13B and laser range finder (LRF) 10, processor 11 is communicatively connected to main encoders 4, 5 and automatic calibration seeker 8. As described above with respect to FIG. 10, automatic calibration seeker 8 includes sensor 19, e.g., a camera and/or LRF, that informs the processor of an orientation of the reflector, relative to the seeker gimbal set, when within a coverage area. Seeker gimbal set 18 includes pitch and yaw actuators 15, 17 and seeker encoders (resolvers) 14, 16 on each axis installed within the enclosure of seeker 8. Seeker 8 may be mounted on a side of electronic box 6, or on pointing device 9 when mounted on rail 2.

As illustrated in FIGS. 3A and 3B, GNSS antenna 1A of the P3I is communicatively connected to GNSS receiver 13A that may be inside the electronics box 6. Similarly, GNSS antenna 1B of the calibration antenna assembly is communicatively connected to GNSS receiver 13B that may be inside or outside electronics box 6. Each of the first and second GNSS receivers 13A, 13B may operate on signals from at least one of a Global Positioning System and a Global Navigation Satellite System, including GLONASS, GALILEO or BeiDou, augmented by at least one of real time kinematic positioning, a satellite based augmentation system, a wide area augmentation system, a selective availability anti-spoofing module, and a carrier phase interferometer technique resolving integer ambiguity of a carrier phase difference between the first and second antennas. In an embodiment, inertial measurement unit (IMU) 12, communicatively connected to the main encoders, may be included in electronics box 6 to provide readout of line-of-sight measurement with pitch and yaw encoders on a display communicatively connected to IMU 12. In this embodiment, like the other embodiments, processor 11 does not rely on any inertial measurement unit to obtain and determine any of the coordinates of the first and second locations, the true north and the pointing vector.

In an embodiment, automatic directional calibration may be obtained actively through automatic calibration seeker 8, illustrated in FIGS. 1B and 10. The automatic calibration seeker 8 actively centers sensor 19 onto an object of reference with a known position within, e.g., 1 m to 30 m or longer, such as calibration reflector 7 in FIGS. 1A and 2, to continuously maintain an accurate relative orientation to the object of reference.

Manual directional calibration is achieved through directing the pointing device 9 toward antenna 1B and obtaining a calibration vector from the P3I to the calibration antenna assembly 1B, 7 by defining a directional angle from the first GNSS antenna 1A to the second GNSS antenna 1B with respect to True North, based on first and second signals from real-time kinematic global navigation satellite systems obtained by GNSS receivers 13A and 13B, and computed in the system processor 11.

The accuracy of a calibration vector depends on the accuracy by which the GNSS receivers 13A and 13B obtains coordinates of the first and second locations of first and second GNSS antennas 1A and 1B and on the distance between the P3I antenna 1A and the calibration antenna assembly antenna 1B which is called the baseline distance. To keep the baseline distance to the absolute minimum, GNSS augmentation methods may be employed, such as differential GNSS and carrier phase wavelength disambiguation and/or real time kinematic (RTK) GPS.

A GNSS receiver operating on the principle of RTK requires ingestion of correction data into the positioning solution. The RTK corrections consist of a stream of data that is transported in a Radio Technical Commission for Maritime Services (RTCM) format. The RTCM data is generated by an RTK base station (not shown) embedding a GNSS receiver with a known antenna location and a processor that computes the corrections. A GNSS receiver operating on the principle of RTK requires RTCM data from an RTK base station that is within 20 miles, with improved accuracy if closer. The most common way to obtain RTK correction data is to find a nearby RTK base station that broadcasts RTCM data over the networked transport of RTCM via internet protocol (NTRIP).

As illustrated in FIGS. 3A and 3B, the P3I may be equipped with RF receiver or transceiver 20 to receive RTCM corrections from services such as NTRIP. Alternatively, RTCM corrections may be received directly over an RF data link from an ad-hoc RTK base station when internet access is not available, or when NTRIP does not provide corrections of an RTK base station within 20 miles of the P3I. Such an ad-hoc RTK base station may be installed with a selective availability and anti-spoofing module (SAASM) as well as the P3I GNSS receiver 13A and the calibration antenna assembly GNSS receiver 13B.

In another embodiment, instead of receiving RTCM data via RF receiver 20, the P3I may generate RTK correction data. GNSS antenna 1B and GNSS receiver 13B of the calibration antenna assembly may generate RTK corrections internally in the processor 11 for use by GNSS receiver 13A. This eliminates the need to install an ad-hoc RTK base station in the vicinity when an RTK base station is not within 20 miles of the P3I, thereby reducing material, components and complexity of the system.

The processor 11 may also perform GNSS carrier phase disambiguation internally to further reduce the baseline (the distance between GNSS antennas 1A and 1B) by an order of magnitude compared to a standard RTK computation. Thus, an accuracy of 0.02° can be obtained with a baseline of three meters or less using 14-bit encoders. Using the same encoders, a baseline of 30 m provides an angle accuracy that is 10 times better. Higher accuracy can be obtained by increasing the baseline and increasing the number of bits in the encoder. For example, 0.005° angular accuracy can be obtained using a 16-bit encoder and about 10 m baseline, such as when a precise heading is required for an OOI 5 km away.

Figure 4A:
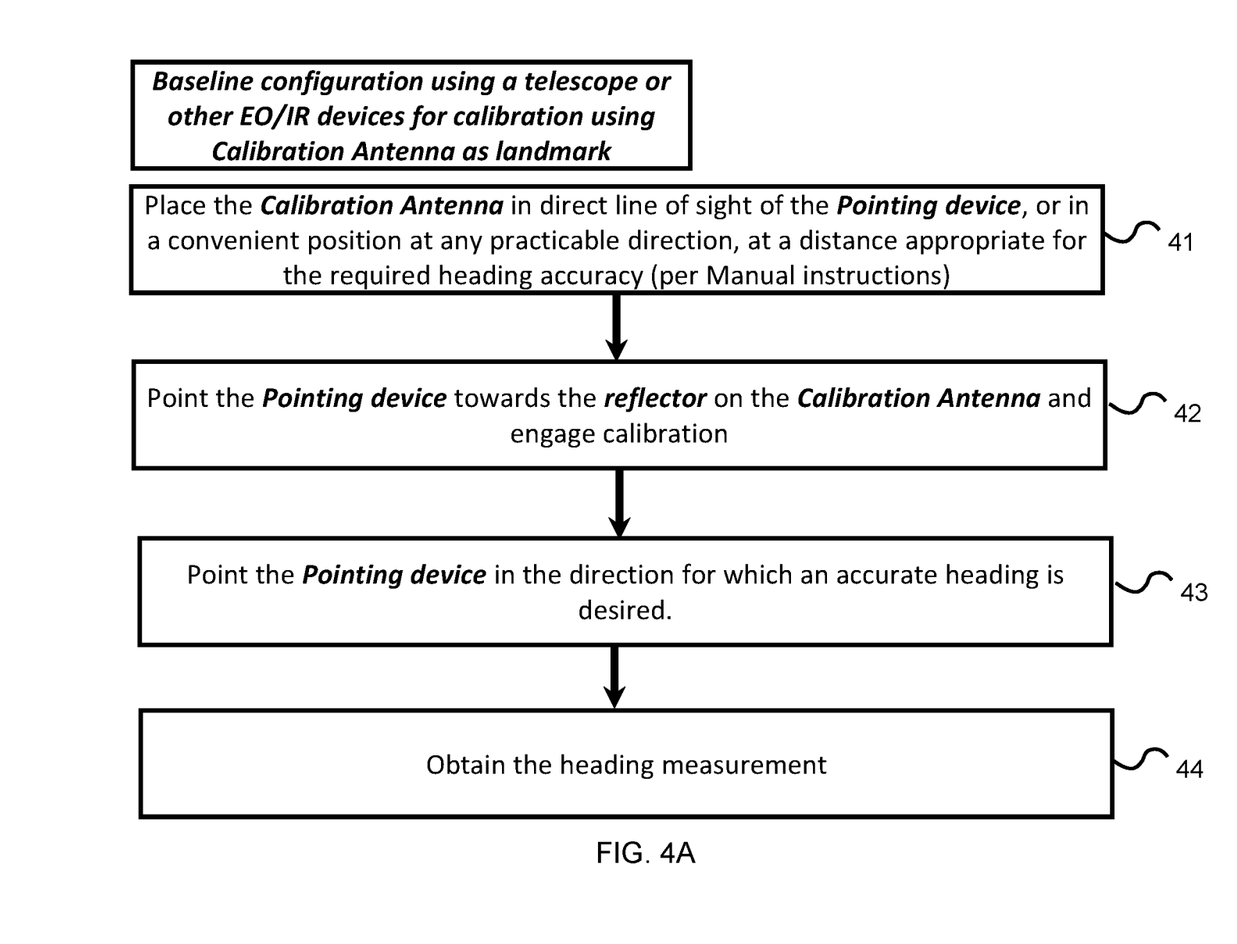
FIG. 4A is a flowchart of a method for calibrating and operating a precision positioning and pointing instrument (P3I).

FIG. 4A is a flowchart of a manual process for calibrating and pointing or geolocating a desired object of interest (OOI) 21 (FIG. 6). After positioning, the P3I at a first location, a human operator positions 41 the calibration antenna assembly 1B, 7 in a direct line of sight from the P3I (with open space therebetween) and separated a baseline distance from the P3I that ensures calibration with the required accuracy. The operator manually points 42 the universal mounting rail 2 of the P3I with pointing device 9 mounted thereon at the calibration reflector 7 of the calibration antenna assembly to align the pointing instrument with the second antenna. The operator may use a sighting device such as a scope 9 and/or a laser range finder 10 attached to the universal mounting rail 2 to aid the alignment process.

Once pointing device 9 is locked on reflector 7, the operator engages the calibration software. In an embodiment, triggering a switch on the electronic box panel causes software in processor 11 to determine True North using all collected data from the sensors. Then, first angular measurements of the main gimbal set are detected by main pitch and yaw encoders 4, 5 in the main gimbal set while pointing device 9 is aligned with the second antenna to calibrate main pitch and yaw encoders 4, 5. This enables processor 11 to determine a baseline from the first antenna 1A to the second antenna 1B in the geographical coordinate system aligned with True North.

After receiving feedback from the P3I indicating a successful calibration, the operator points 43 the pointing device 9 on the universal mounting rail 2 towards the desired direction, e.g., aligned with a desired object of interest (OOI) 21 (FIG. 6) for which an accurate bearing is required. The processer 11 determines a pointing vector in the geographical coordinate system from a second set (different from the first set) of angular measurements of the main gimbal set from main encoders 4, 5 in the main gimbal set and the baseline, while pointing device 9 is aligned with the object of interest. As a result, an operator can read the heading obtained 44 by the P3I on a tablet or on a mobile device which could be transmitted out over a local network (e.g. a gun-rail system, or some other link) to other peripheral devices communicatively connected with the P3I.

Figure 4B:
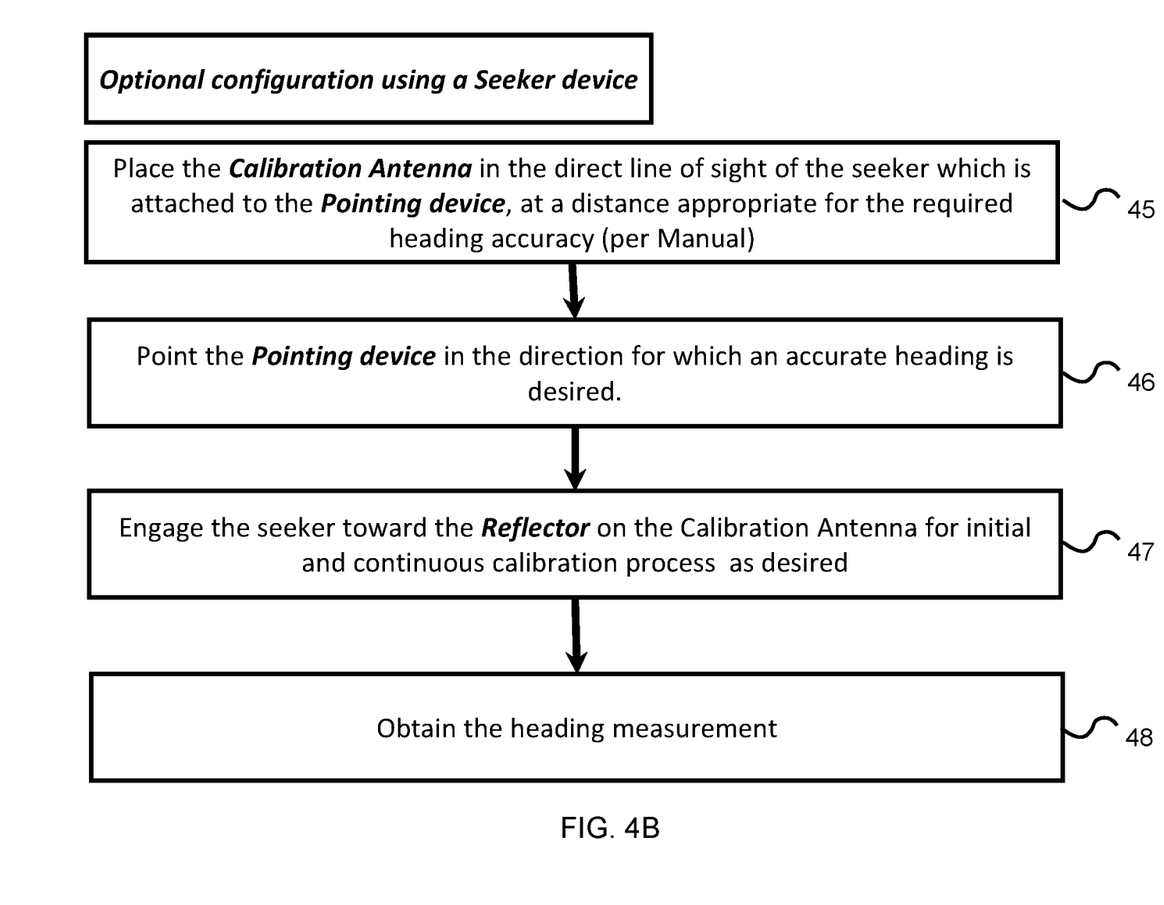
FIG. 4B is a flowchart of a method for calibrating and operating a P3I with a seeker or other automatic calibration.

FIG. 4B is a flowchart of an automated process of calibration for geolocation of a desired object of interest 21 (FIG. 6) using automatic calibration seeker 8 that operates as a reflector seeking apparatus. After positioning 45 the calibration antenna assembly 1B, 7, the operator points 46 the universal mounting rail 2 towards the desired direction or towards the desired object of interest (OOI) 21 for which an accurate bearing is required. The operator engages 47 automatic calibration seeker 8 which receives commands from processor 8 instructing the actuators 15, 17 to move seeker gimbal set 18 based on coordinates of the calibration reflector within the coverage area to maintain an alignment of the seeker gimbal set and the calibration reflector 7 of the calibration antenna assembly that was positioned at the required distance per system manual and within the field of the view of the automatic calibration seeker 8. The automatic calibration seeker 8 maintains lock onto the calibration reflector 7 and provides updated calibration information to the processor as long as the calibration antenna assembly 1B, 7 remains within a coverage area in the automatic calibration seeker's field of view. Thus, the P3I obtains 44 the heading in which pointing device 9 is directed In the embodiment illustrated in FIGS. 1B and 4B, the operator no longer has to point the universal mounting rail 2 of the P3I system directly to the calibration reflector 7 of the calibration antenna assembly to acquire an initial calibration. The operator may use a sighting device such as a scope 9 and/or a laser range finder 10 attached to the universal mounting rail 2 to point at the OOI 21, during which the automatic calibration seeker 8 automatically acquires lock onto the calibration reflector 7 of the calibration antenna assembly, and thus providing a continuous ongoing automated calibration while the operator is sighting the OOI 21.

The GNSS receivers 13A and 13B may also be fitted with a selective availability anti-spoofing module (SAASM).

Figure 5:
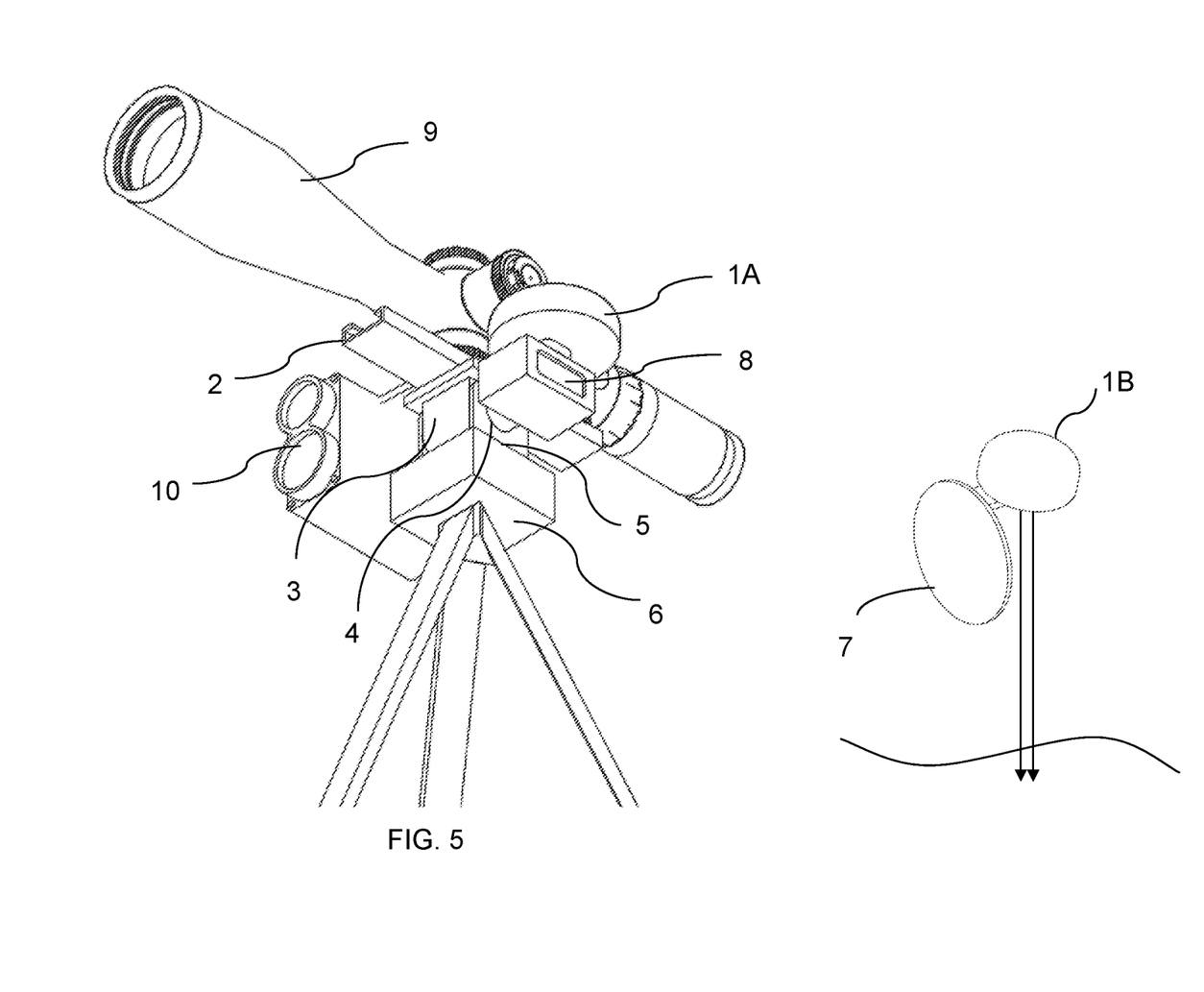
FIG. 5 is a perspective view from below of a precision positioning and pointing instrument (P3I) with a laser range finder, and a calibration antenna assembly.

FIG. 5 is a perspective view from below of the P3I and is an example of how the P3I can be used for accurately geolocating an OOI 21 (FIG. 6) by mounting to the rail 2 a telescope 9 and point a laser range finder 10. Also, in FIG. 5 are GNSS antenna 1A, automatic calibration seeker 8, electronics box 6 and main gimbal set 3 as part of the P3I, while GNSS Antenna 1B and reflector 7 are on a separate pole.

FIG. 6 is a top view of the P3I illustrating telescope 9 and laser range finder (LRF) 10 on the P3I to accurately identify the range to the OOI 21 for enhanced performance and for geolocation accuracy. The LRF 10 measures a distance from pointing device 9 to the OOI while the pointing device 9 is aligned with the OOI 21. Then processor 11 determines coordinates of the OOI 21 in the geographical coordinate system, based on the pointing vector and the distance from the pointing instrument to the OOI 21.

According to an aspect of an embodiment, the described features, functions, operations, and/or benefits can be implemented by and/or use processing hardware and/or software executed by processing hardware. For example, processor 11 illustrated in FIGS. 3A and 3B may include a central processing unit (CPU) or microcontroller, one or more processing devices (e.g., chipset(s), including memory, etc.) that processes or executes instructions, software or program(s), stored in the memory and/or non-transitory computer readable media. The electronics box 6 may include a transmission communication interface, communicatively connected to the processor, which may include a network interface in addition to RF transceiver 20 and/or a user input/output interface, for example, a display device and/or keyboard to. The user input/output interface may supply a user with the second set of angular measurements of the main gimbal set and the distance to the OOI when the pointing device is pointed at the OOI. For example, the communication interface may communicate wirelessly with a movable apparatus with a display, such as a laptop, tablet or smartphone.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

REFERENCE NUMERALS

1A Antenna for Global Navigation Satellite Systems Global Positioning System (GNSS GPS) installed on a Precision Positioning and Pointing Instrument (P3I)
1B Calibration Antenna for GNSS GPS attached to reflector 7 at a distance from the P3I of 1 m to 30 m, or more
2 Rail—mount for pointing device 9, an LRF 10 or other components on the P3I
3 Main gimbal set and resolver assembly—a two-axis gimbal with inserted resolvers to allow measurement of the angular movement of the pointing device 9
4 Pitch Resolver—encoder installed on the main gimbal set 3 for angle measurements and indication
5 Yaw Resolver—installed on the main gimbal set 3 for angle measurements and indication
6 Electronics Box—enclosure containing avionics components
7 Reflector—object with a reflective surface, attached to the calibration antenna 1B
8 Seeker—electronic encoders, a camera and LRF on seeker gimbal set 18 with actuators/servos in an embodiment capable of auto-calibration of the P3I
9 Pointing Device—a Telescope or an Electro-Optical/Infra-Red (EO/IR) camera or similar optical pointing device
10 LRF—Laser Range Finder—measures range from the pointing device to an object of interest (OOI) positioned at 1 to 5 km, or more from the P3I
11 Processor—a digital computer, e.g., microprocessor, microcontroller, etc., in the electronics box 6
12 IMU—Inertial Measurement Unit—in the electronics box 6 on main gimbal set 3 that with pitch and yaw encoders provides readout of line-of-sight measurement
13 GNSS GPS Receivers—two 2 real-time kinematic (RTK) Global Navigation Satellite Systems Global Positioning System receivers included in the P3I system and, in an embodiment, used by a selective availability anti-spoofing module (SAASM)
14 Pitch Encoder in automatic calibration seeker 8—an internal encoder for continuous calibration by the automatic calibration seeker 8
15 Pitch Actuator in automatic calibration seeker 8—an internal actuator for continuous calibration by the automatic calibration seeker 8
16 Yaw Encoder in automatic calibration seeker 8—an internal encoder for continuous calibration by the automatic calibration seeker 8
17 Yaw Actuator in automatic calibration seeker 8—an internal actuator for continuous calibration by the automatic calibration seeker 8
18 Seeker gimbal set in automatic calibration seeker 8—an internal gimbal on which sensors are mounted in the automatic calibration seeker 8
19 Sensors in automatic calibration seeker 8—internal sensors to maintain calibration, such as a camera, laser, radar, or other known technology
20 RF COMM—radio frequency transceiver—providing a Bluetooth, Wi-Fi, cellular or UHF band data link with a peripheral device and the P3I. In an embodiment receives Radio Technical Commission for Maritime Services (RTCM) corrections from services via Networked Transport of RTCM via Internet Protocol (NTRIP) or an RF data link 21 Object of Interest (OOI)

What is claimed is:

1. A positioning and pointing system that detects signals from real-time kinematic global navigation satellite systems, comprising:
    a base with a main gimbal set mounted thereon, the main gimbal set having at least two axes, positioned by a user at a first location;
    main encoders that respectively detect angular measurements of the main gimbal set;
    a pointer pointing device mounted on the main gimbal set;
    a first antenna, disposed at the main gimbal set, that receives first signals from the real-time kinematic global navigation satellite systems;
    a second antenna, positioned at a second location selected by a user and separated at a baseline distance from the first location with open space therebetween, that receives second signals from the real-time kinematic global navigation satellite systems;
    a reflector co-located with the second antenna;
    at least one receiver, communicatively connected to the first and second antennas, that determines the first and second locations of the first and second antennas in a geographical coordinate system aligned with true north;
    a reflector seeking apparatus, mounted on the base, that automatically obtains a direction to the second location of the second antenna by maintaining alignment with the reflector; and
    a processor, communicatively connected to the reflector seeking apparatus, the main encoders and the at least one receiver, that
        obtains coordinates of the first and second locations of the first and second antennas in the geographical coordinate system from the at least one receiver and the reflector seeking apparatus, respectively,
        determines a baseline vector from the coordinates of the first and second locations and a first set of angular measurements of the main gimbal set, and
        determines a pointing vector from a second set, different from the first set, of angular measurements of the main gimbal set.

2. The positioning and pointing system according to claim 1, used to determine a distance to an object of interest, further comprising a laser range finder, mounted on the main gimbal and communicatively connected to the processor, that obtains the distance to the object of interest.

3. The positioning and pointing system according to claim 2, further comprising a communication interface, communicatively connected to the processor, supplying to the user at least the second set of angular measurements of the main gimbal set and the distance to the object of interest, when the pointing device is pointed at the object of interest.

4. The positioning and pointing system according to claim 3, wherein a movable apparatus with a display communicates with the communication interface and displays at least the second set of angular measurements of the main gimbal set and the distance to the object of interest to the user.

5. The positioning and pointing system according to claim 1,
    wherein the reflector seeking apparatus comprises:
        a seeker gimbal set, communicatively connected to the processor, including seeker encoders that respectively detect the angular measurements of the seeker gimbal set, and
        actuators that move the seeker gimbal set in response to commands from the processor; and
        a sensor, aligned with the seeker gimbal set and communicatively connected to the processor, that informs the processor of an orientation of the reflector, relative to the seeker gimbal set, when within a coverage area, and
    wherein the processor instructs the actuators to move the seeker gimbal set based on the coordinates of the second location where the reflector is positioned within the coverage area to maintain an alignment of the seeker gimbal set and the reflector.

6. The positioning and pointing system according to claim 5, wherein the sensor includes a camera.

7. The positioning and pointing system according to claim 5, wherein the sensor includes a telescope.

8. The positioning and pointing system according to claim 5,
    further comprising a laser, and
    wherein the sensor detects reflection of the laser from the reflector.

9. The positioning and pointing system according to claim 5, wherein the sensor detects the reflector by radar.

10. The positioning and pointing system according to claim 1, wherein the at least one receiver includes first and second receivers communicatively connected to the first and second antennas, respectively, each of the first and second receivers operating on signals from at least one of a Global Positioning System and a Global Navigation Satellite System, augmented by at least one of real time kinematic positioning, a satellite based augmentation system, a wide area augmentation system, a selective availability anti-spoofing module, and a carrier phase interferometer technique resolving integer ambiguity of a carrier phase difference between the first and second antennas.

11. The positioning and pointing system according to claim 1,
    further comprising:
        an inertial measurement unit, communicatively connected to the main encoders; and
        a display, communicatively connected to the inertial measurement unit, that displays a readout of line-of-sight measurement, and
    wherein the processor does not rely on the inertial measurement unit to obtain and determine any of the coordinates of the first and second locations, the geographical coordinate system aligned with true north and the pointing vector.

12. A method of detecting coordinates by a pointing instrument, comprising:
    positioning, at a first location, the pointing instrument having a base with a main gimbal set mounted thereon, the main gimbal set having at least two axes, and a first antenna, disposed at the main gimbal set, that receives first signals from real-time kinematic global navigation satellite systems;
    positioning at a second location a reflector and a second antenna that receives second signals from the real-time kinematic global navigation satellite systems, the second location separated by a baseline distance from the first location with open space therebetween;
    aligning the pointing instrument with the second antenna and the reflector;
    automatically obtaining, by a reflector seeking apparatus mounted on the base, a direction to the second location of the second antenna and the reflector by maintaining alignment with the reflector;

determining, by at least one receiver communicatively connected to the reflector seeking apparatus and the first and second antennas, first and second coordinates of the first and second locations of the first and second antennas, respectively, in a geographical coordinate system and defining a directional angle from the first antenna to the second antenna with respect to true north, based on first and second signals from the real-time kinematic global navigation satellite systems;

detecting first angular measurements of the main gimbal set from main encoders in the main gimbal set while the pointing instrument is aligned with the second antenna; and determining, by a processor communicatively connected to the main encoders and the at least one receiver, a baseline from the first antenna to the second antenna in the geographical coordinate system.

13. The method according to claim 12, further comprising:
aligning the pointing instrument with an object of interest by a user;
detecting second angular measurements of the main gimbal set from the main encoders in the main gimbal set while the pointing instrument is aligned with the object of interest; and
determining, by the processor, a vector in the geographical coordinate system from the pointing instrument to the object of interest, based on second angular measurements of the main gimbal set and the baseline.

14. The method according to claim 13, further comprising:
measuring a distance from the pointing instrument to the object of interest by a laser range finder, while the pointing instrument is aligned with the object of interest; and
determining, by the processor, third coordinates of the object of interest in the geographical coordinate system, based on the vector and the distance from the pointing instrument to the object of interest.

15. The method according to claim 14,
wherein said aligning of the pointing instrument with the second antenna is performed by the user, and
wherein said automatically obtaining comprises, after said aligning of the pointing instrument with the second antenna:
detecting the reflector, co-located with the second antenna, within a coverage area of a sensor at the first location;
determining an orientation of the reflector relative to the pointing instrument; and
automatically maintaining alignment of the sensor with the reflector based on said detecting of the reflector.

16. The method according to claim 15,
wherein the sensor is aligned with a seeker gimbal set, communicatively connected to the processor, including seeker encoders that respectively detect the angular measurements of the seeker gimbal set, and
wherein said automatically maintaining alignment of the sensor includes instructing actuators, via commands from the processor, to move the seeker gimbal set based on the second coordinates of the second location within the coverage area.

17. The method according to claim 12, further comprising after said aligning is performed by a user:
detecting a reflector, co-located with the second antenna, within a coverage area of a sensor at the first location;
determining, by the processor, an orientation of the reflector relative to the pointing instrument; and
automatically maintaining, by the processor, alignment of the sensor with the reflector based on said detecting of the reflector.

18. The method according to claim 12,
further comprising:
obtaining a line-of-sight measurement by an inertial measurement unit communicatively connected to the main encoders; and
displaying the line-of-sight measurement obtained by the inertial measurement unit, and
wherein the processor does not rely on the inertial measurement unit in said determining of the baseline.

* * * * *